(12) United States Patent
Rossi et al.

(10) Patent No.: US 9,212,757 B2
(45) Date of Patent: Dec. 15, 2015

(54) DEVICE FOR ACTIVATING A PASSIVE EJECTOR VALVE FOR PRESSURISING A TURBOJET ENGINE CHAMBER FOR AN AIRCRAFT

(75) Inventors: Giuliana Elisa Rossi, Paris (FR); Eddy Stéphane Joël Fontanel, Paris (FR); Marie Gentilhomme, Maisons Alfort (FR)

(73) Assignee: SNECMA, Paris (FR)

( * ) Notice: Subject to any disclaimer, the term of this patent is extended or adjusted under 35 U.S.C. 154(b) by 414 days.

(21) Appl. No.: 13/585,911

(22) Filed: Aug. 15, 2012

(65) Prior Publication Data

US 2014/0034146 A1 Feb. 6, 2014

(30) Foreign Application Priority Data

Aug. 16, 2011 (FR) ..................................... 11 57355

(51) Int. Cl.
*F01D 25/18* (2006.01)
*F16K 31/00* (2006.01)

(52) U.S. Cl.
CPC .............. *F16K 31/00* (2013.01); *F01D 25/18* (2013.01); *F05D 2260/601* (2013.01); *F05D 2270/301* (2013.01); *Y10T 137/1939* (2015.04); *Y10T 137/2012* (2015.04)

(58) Field of Classification Search
CPC ... F01D 25/18; F16K 31/00; F05D 2270/301; F05D 2260/601; Y10T 137/2012; Y10T 137/1939
USPC ............... 137/81.1, 78.5; 60/782, 785, 39.08; 184/6.11
See application file for complete search history.

(56) References Cited

U.S. PATENT DOCUMENTS

| | | | | |
|---|---|---|---|---|
| 2,239,553 A | * | 4/1941 | Dodson | 261/72.2 |
| 2,312,063 A | * | 2/1943 | Allen et al. | 184/6.4 |
| 2,342,184 A | * | 2/1944 | Fawcett | 137/81.1 |
| 2,412,071 A | * | 12/1946 | Warner et al. | 454/73 |
| 2,583,006 A | * | 1/1952 | Niesemann | 137/81.1 |
| 2,625,009 A | * | 1/1953 | Leggett et al. | 60/785 |
| 2,644,513 A | * | 7/1953 | Mock | 60/39.281 |
| 2,725,956 A | * | 12/1955 | Cunningham | 184/6.23 |
| 2,816,561 A | * | 12/1957 | Krueger | 137/81.1 |
| 3,487,993 A | * | 1/1970 | Rannenberg | 415/28 |
| 3,526,240 A | * | 9/1970 | Oroza | 137/81.1 |
| 3,572,356 A | | 3/1971 | Pinto | |
| 3,596,669 A | * | 8/1971 | Alberani | 137/81.1 |

(Continued)

FOREIGN PATENT DOCUMENTS

| | | |
|---|---|---|
| EP | 0 159 772 | 10/1985 |
| EP | 1 316 678 | 6/2003 |

(Continued)

OTHER PUBLICATIONS

French Search Report dated Mar. 26, 2012.

*Primary Examiner* — Kevin Murphy
*Assistant Examiner* — David Colon Morales
(74) *Attorney, Agent, or Firm* — Pillsbury Winthrop Shaw Pittman LLP

(57) ABSTRACT

An apparatus for activating a valve of an ejector in order to adapt the pressurization of a chamber in an aircraft turbojet engine comprising a device constructed and arranged to trigger the opening and/or closing of valve and/or the power of the valve as a function of the altitude at which the valve is located.

14 Claims, 2 Drawing Sheets

(56) References Cited

U.S. PATENT DOCUMENTS

| | | | |
|---|---|---|---|
| 3,665,950 A | 5/1972 | Nelson | |
| 3,698,412 A * | 10/1972 | Smyly | 137/81.1 |
| 3,876,329 A * | 4/1975 | Miller | 416/28 |
| 3,994,617 A * | 11/1976 | McCombs | 415/28 |
| 4,183,372 A * | 1/1980 | Ueda et al. | 137/81.1 |
| 4,304,093 A * | 12/1981 | Schulze | 60/806 |
| 4,332,268 A * | 6/1982 | Yoshimura et al. | 137/81.1 |
| 4,387,572 A * | 6/1983 | Richardson et al. | 60/602 |
| 4,391,290 A * | 7/1983 | Williams | 137/81.1 |
| 4,569,196 A * | 2/1986 | Waddington et al. | 60/39.08 |
| 4,622,815 A * | 11/1986 | Piesche | 60/602 |
| 4,716,723 A * | 1/1988 | Ralston et al. | 60/39.281 |
| 4,805,658 A * | 2/1989 | Perkinson et al. | 137/81.1 |
| 4,903,721 A * | 2/1990 | Maier | 137/81.1 |
| 6,058,694 A * | 5/2000 | Ackerman et al. | 60/39.08 |
| 6,282,881 B1 * | 9/2001 | Beutin et al. | 60/39.08 |
| 6,708,708 B2 * | 3/2004 | Wingert et al. | 137/12 |
| 6,732,521 B2 * | 5/2004 | Otake | 60/601 |
| 6,837,225 B1 * | 1/2005 | Fukuda | 123/552 |
| 7,066,808 B2 * | 6/2006 | Whitney et al. | 454/70 |
| 7,174,997 B2 * | 2/2007 | Sheridan | 184/6.26 |
| 7,299,817 B2 * | 11/2007 | Gisler et al. | 137/81.1 |
| 7,509,968 B2 * | 3/2009 | Surawski | 137/209 |
| 7,527,481 B2 * | 5/2009 | Baryshnikov et al. | 417/183 |
| 2006/0054406 A1 * | 3/2006 | Delaloye | 184/6.11 |
| 2008/0118371 A1 * | 5/2008 | Vasquez et al. | 417/77 |
| 2009/0078506 A1 * | 3/2009 | Franconi | 184/5.1 |
| 2009/0111370 A1 * | 4/2009 | Porte et al. | 454/76 |

FOREIGN PATENT DOCUMENTS

| | | |
|---|---|---|
| EP | 1 795 710 | 6/2007 |
| EP | 2 119 892 | 11/2009 |
| GB | 790831 | 9/1953 |
| GB | 790834 | 1/1954 |

* cited by examiner

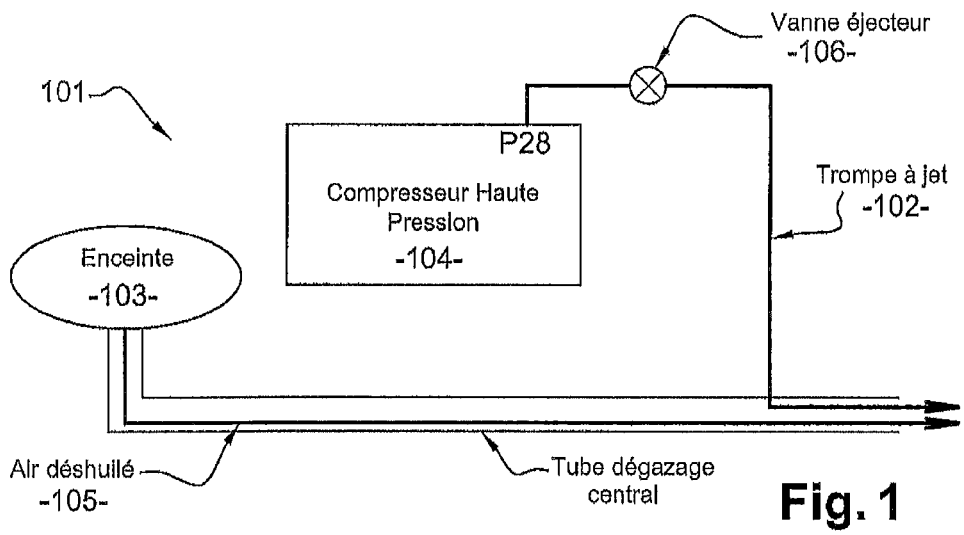
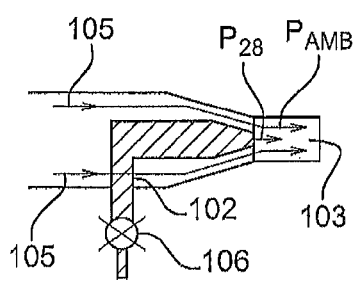
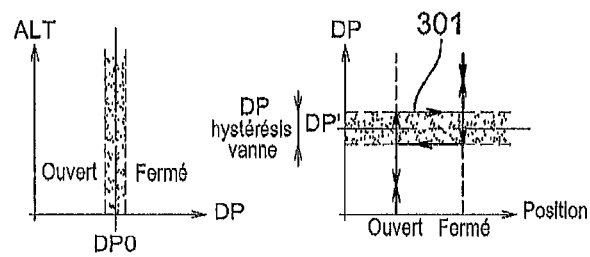
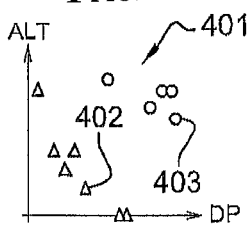
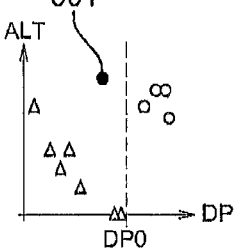
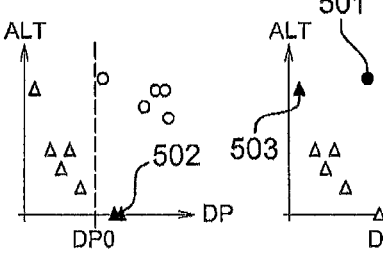
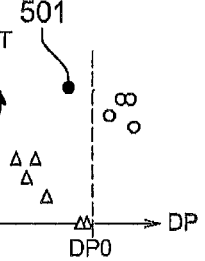
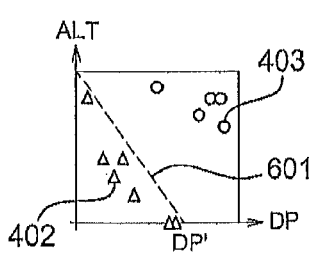
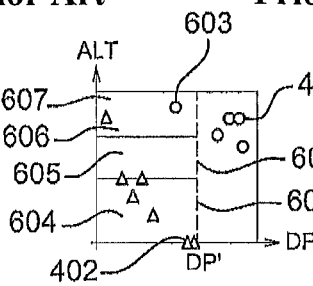
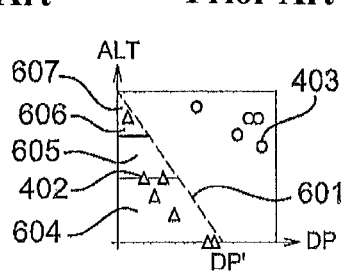

DEVICE FOR ACTIVATING A PASSIVE EJECTOR VALVE FOR PRESSURISING A TURBOJET ENGINE CHAMBER FOR AN AIRCRAFT

CROSS REFERENCE TO RELATED APPLICATIONS

This application claims the benefit of priority from French Patent Application No. 1157355 filed on Aug. 16, 2011, the entire content of which is incorporated herein by reference.

FIELD

The present invention relates to an activation apparatus for a passive ejector valve for improving the pressurisation of an aircraft turbojet engine system. An aspect thereof is essentially to optimise the function of such an ejector valve. The field of the invention is generally that of aircraft turbojet engines, and more precisely that of controlling the turbojet engines for the purpose of ensuring that the chambers inside the turbojet engines under consideration are liquid-tight.

BACKGROUND

A significant safety factor to be considered for systems that hold oil is that chambers inside the turbojet engines should be completely liquid-tight. Generally, the liquid-tight property of the chambers in turbojet engines is established by ensuring that a pressure difference is maintained between the outside of the chamber and the inside of the chamber at sealing limits of said chamber; the pressure difference should be such that the pressure inside the chamber is lower than the pressure outside the system by at least a value determined in advance.

As is shown in FIGS. 1 and 2, a jet pump system 102 is currently used to pressurise oil chambers in a turbojet engine 101, for example the LEAP-X®. Such a jet pump system, 102, also called an ejector or eductor, is a device that enables the pressure in a chamber to be improved when turbojet 101 is operating at low speed, while still ensuring that the pressure differential specifications at the chamber sealing limits are preserved. For this purpose, in the case of the LEAP-X® for example, ejector 102 draws in air at pressure P28 (P28 is the intake plan on the LEAP-X®, not generic), typically via a high pressure compressor 104 of turbojet 101 and mixes it with oil-free air 105 coming from chamber 103 at the centre vent tube. This supplementary air is injected by ejector 102 and creates an aspiration effect inside chamber 103, thus leading to a fall in pressure inside chamber 103 itself, and consequently a greater pressure differential at the sealing limits of chamber 103 that is being analysed. This device is necessary for the limits when turbojet 101 is running slowly when the pressure levels inside and outside the chamber are close to one another as well as close to the ambient pressure; it is therefore desirable to know the pressure differential that is needed.

Accordingly, in order to prevent oil leaks at low turbojet speeds, it is desirable to activate ejector 102 to ensure that a given pressure differential is maintained at the sealing limits of chamber 103. However, the extraction of air from inside high-pressure compressor 104 by means of ejector 102 is not neutral in terms of the performance of the turbojet, particularly during high-speed phases of the turbojet; this is why pressurisation of the chambers is most often maintained with regard to the exterior/interior pressure differential without the use of an ejector during high-speed phases.

It is therefore desirable to provide for controlled use of an ejector 102 to ensure that it is not used all the time. Accordingly, in the prior art use of control valve 106 for ejector 102 is provided, which is capable of switching from an on state, in which the pulsed air is directed into the centre vent tube, as the valve is in a completely open position, to a blocking state, in which no pulsed air is sent into the centre vent tube by the ejector because valve 106 is in a completely closed position.

The valve is designed for passive operation—it is called a passive valve—, that is to say the opening/closing movement of the valve, as shown in FIG. 3A, is controlled solely by a pressure differential that actuates it when the pressure differential reaches a trigger threshold DP0, this pressure differential being the difference in pressure between the P28 pressure drawn from high-pressure compressor 104 and the pressure surrounding the valve, or ambient pressure Pamb.

As is shown in FIG. 3B, the principle of operation of passive valve 106 includes a hysteresis 301 that offsets the operations of opening/closing the valve.

FIG. 4 represents a mapping 401 of different situations to which the passive valve may be exposed. Accordingly, in this figure, which has the form of an orthogonal coordinate system, the x-axis corresponds to a pressure differential DP maintained at the limits of passive valve 106, while the y-axis corresponds to an altitude at which valve 106 is located. The various situations—or operating points—are physically represented by triangles 402, which correspond to the case in which turbojet 101 is operating at low speed, and for which ejector 102 is in the on state, or by circles 403, which correspond to the case in which turbojet 101 is operating at high speed, and for which ejector 102 is in the blocking state.

As is shown in FIGS. 5A, 5B and 5C, a difficulty then arises in determining the activation threshold of one of the two configurations (ejector in on state or ejector in blocking state). In fact, if DP0 is defined as a constant regardless of the altitude under consideration, it is observed that:

as shown in FIG. 5A, high-speed situations 501 are complied with for a pressure differential level DP lower than threshold DP0, valve 106 then being open, the ejector thus being activated in such manner that engine performance may be impaired;

as shown in FIG. 5B, either low-speed situations 502 are maintained for a pressure differential DP level higher than threshold DP0, in which case valve 106 is closed, thus also deactivating ejector 102 with the associated risk of not satisfying the minimum pressure differential specifications for the purpose of liquid-tightness, and possibly allowing oil leaks to occur.

Moreover, as shown in FIG. 5C, there are situations 503 at low speed and high altitude for which it is possible that the ejector with its check valve fully open may create excessive aspiration within the chambers, thus leading to an excessively sharp loss of pressure in the oil chambers, so that this pressure falls to a level below a minimum pressure that is essential to ensure the proper functioning of the oil recovery pumps associated with the chamber.

In view of the above, it is desirable to provide a valve on the ejector with an activation system that:

enables the ejector to be activated only at low speed operating points in order to guarantee the minimum pressure differential at the sealing limits of the chamber, and also to avoid the risk of oil leaks occurring;

prevents air from being drawn from the high-pressure compressor at the high speed operating points in order to avoid impairing engine performance;

and beneficially reduces the power of the ejector in low speed phases and at high altitude in order not to interfere with the operation of the oil recovery pumps.

It is clear that such a valve type is complex. A valve governed by the full authority digital engine control (FADEC) that satisfies these requirements exists, ensuring the proper function of the jet pump at the various operating points of the flight envelope of the LEAP-X®. However, this is a solution that requires a FADEC output and entails higher cost. Such a solution exceeds the definition limits of passive ejector valves because it relies on an electrical control.

SUMMARY

An aspect of the invention offers a solution to the problems described in the preceding by providing an apparatus or device for activating a passive ejector valve, which control device satisfies at least the requirements according to which the ejector is only activated at the low speed operating points and the ejector is stopped in order to prevent intake of air from the high-pressure compressor for all of the high-speed operating points in order to avoid impairing engine performance.

To this end, in an embodiment according to the invention the operation of the valve is rendered dependent on the altitude at which it is located. In an embodiment, the valve is still a passive valve with two positions—position 100% open and position 100% closed—the activation threshold of which depends on its altitude. In another embodiment, the valve opens gradually as a function of its altitude. In yet another embodiment, the valve's activation threshold depends on its altitude and the valve opens gradually as a function of its altitude once the activation threshold has been reached.

An aspect of the present invention therefore relates essentially to an apparatus for activating a passive ejector valve in order to improve the pressurisation of a chamber in an aircraft turbojet engine, the apparatus comprising a device constructed and arranged to trigger the opening and/or closing of the valve and/or the power of the valve depending on the altitude at which the valve is located. The power of the valve refers to the quantity of air that it allows to pass per unit of time.

The device constructed and arranged to trigger the opening and/or closing of the valve can be broadly termed a "trigger."

An aspect of the present invention therefore relates essentially to an apparatus for activating a passive ejector valve in order to improve the pressurisation of a chamber in an aircraft turbojet engine, the apparatus comprising a means for triggering the opening and/or closing of the valve and/or the power of the valve depending on the altitude at which the valve is located.

Besides the main features, which were outlined in the previous paragraph, the apparatus according to an embodiment of the invention may include one or more additional characteristics from the following, either individually or in any technical possible combination:

the device constructed and arranged to trigger the opening and/or closing of the valve is constructed and arranged to toggle the valve between a fully open position and a fully closed position as a function of a triggering threshold determined by the altitude; accordingly, no intermediate position is possible for the valve;

the device constructed and arranged to trigger the opening and/or closing of the valve comprises:

a multiplier element that receives ambient air pressure and air drawn from the high-pressure compressor at its intake;

a binary flap valve that receives the air supplied by the multiplier element and ambient pressure air at its intake, the binary flap valve being able to progress from an open position in which the air taken from the high-pressure compressor is sent through the valve to the ejector to create a Venturi effect, and a closed position in which the air is blocked by the valve;

the air received by the multiplier element and the air sent through the valve have the same origin;

the device constructed and arranged to trigger the opening and/or closing of the valve is constructed and arranged to cause the valve to progress from a fully open position to a fully closed position, the valve assuming intermediate, partially open positions as a function of altitude;

the device constructed and arranged to trigger the opening and/or closing of the valve comprises a piston whose movement is controlled by the ambient pressure air, the piston revealing a passage having a profile that varies according to the ambient pressure of the air that controls the travel of said piston, which passage allows the pressurised air to pass through the valve;

the air that controls the travel of the piston comes from a high-pressure compressor of the turbojet engine;

the device constructed and arranged to trigger the opening and/or closing of the valve is constructed and arranged to cause the valve to progress from a fully open position to a fully closed position, said valve assuming intermediate, partially open positions as a function of altitude until a triggering threshold that depends on the altitude relative to a pressure differential exerted on the valve is reached.

An embodiment of the present invention also relates to an aircraft equipped with the apparatus or device according to various embodiments of the invention.

Embodiments of the invention and its various applications will be better understood after reading the following description and reviewing the accompanying figures.

BRIEF DESCRIPTION OF THE DRAWINGS

The figures are intended for purely exemplary purposes and not intended to limit the invention in any way.

In the drawing:

FIG. 1, described in the preceding, is a diagrammatic representation of a part of a turbojet engine according to the prior art, equipped with an ejector having a passive valve;

FIG. 2, also described in the preceding, is a diagrammatic representation of an ejector;

FIGS. 3A and 3B, also described in the preceding, are diagrammatic illustrations of various positions of an ejector valve according to the prior art;

FIG. 4 is a mapping of different situations to which the passive valve may be subjected;

FIGS. 5A to 5C show various representations of the mapping of FIG. 4 that illustrate the difficulty of defining a constant triggering threshold for the valve;

FIGS. 6A to 6C, show various representations of the mapping of FIG. 4 that illustrate different embodiments of an apparatus according to an embodiment of the invention;

DETAILED DESCRIPTION

Figure 7A:
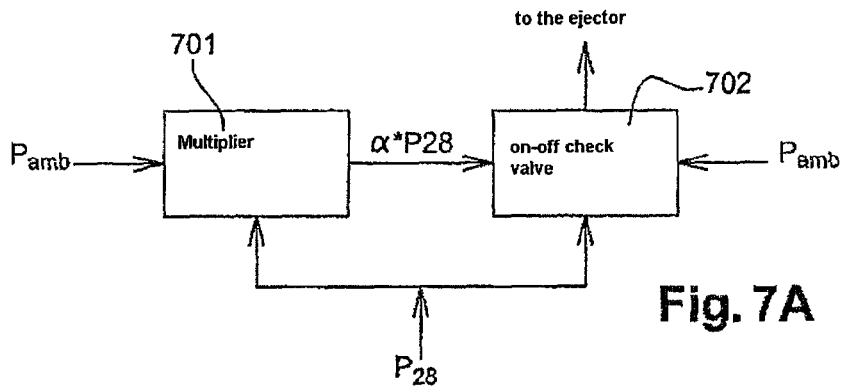
FIGS. 7A and 7B, show various representations of a first example of the apparatus according to an embodiment of the invention.

Unless stated otherwise, the same element appearing in different figures will be identified by the same reference numeral.

In the various illustrations that follow, a pressure differential DP applied to valve 106 for the purpose of actuating it is defined for purely exemplary purposes according to the following relationship: DP=P28−Pamb; where P28 is the pressure in the seventh stage of the high-pressure compressor and Pamb is ambient pressure.

FIG. 6A shows a mapping 401 that illustrates the use of a first exemplary embodiment of the apparatus according to an embodiment of the invention. In this example, it is suggested to implement a two-position passive activation system— valve 106 either fully closed or fully open—with an activation threshold 601 for ejector valve 106 that develops progressively with altitude, valve 106 being open when the operating point under consideration corresponds to a valve exposed to a pressure differential less than activation threshold 601 for a given altitude. The solution suggested thus enables the corresponding valve to be triggered as needed: valve open at low speed points and closed at high speed points.

FIG. 6B shows mapping 401 that illustrates the use of a second exemplary embodiment of the apparatus according to an embodiment of the invention. In this example, it is suggested to implement a passive activation system of a valve whose opening profile varies progressively according to the altitude, with a fixed activation threshold 608 for the valve. Thus, the valve's opening cross section varies progressively with the ambient pressure, which is a direct function of altitude, valve 106 being open when the pressure delta that actuates the valve is lower than activation threshold 608. In this manner, when the valve is open, as the altitude increases so the ambient pressure falls and the passage cross section of the valve also becomes smaller. In the example shown, various plateaux may be observed: a first plateau 604 during which valve 106 is fully open; a second plateau 605 during which valve 106 is 75% open; a third plateau 606 during which valve 106 is 50% open; a third plateau; a fourth plateau 607 during which valve 106 is 25% open.

The solution suggested in this example thus enables the creation of an ejector whose power is modulated when it is active, while thus avoiding the risk of lowering the pressure in the oil chambers to below the pressure specifications for the oil recovery pumps at the low speed and high altitude points.

Since activation threshold 608 is fixed to guarantee that a minimum pressure differential is maintained for all operating points at the sealing points of the chambers, there are a number of high speed operating points 603 for which the ejector does not need to be activated, but for which the ejector is activated anyway. However, with such a valve type, in which the power of the ejector is modulated by altitude, the impact in terms of engine performance of extracting air from the high-pressure compressor during high-speed phases is limited.

FIG. 6C shows the mapping 401 that illustrates the use of a third embodiment of the apparatus according to an embodiment of the invention.

Figure 7B:
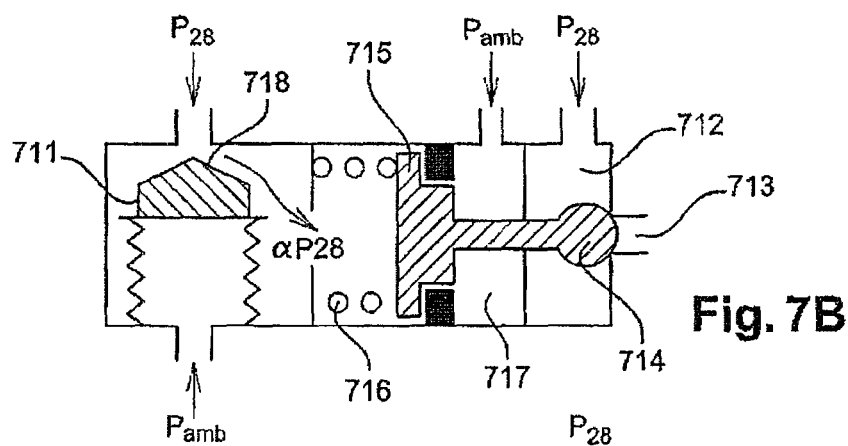

FIGS. 7A and 7B show respectively an outline diagram and a functional diagram of the apparatus according to an embodiment of the invention. In these figures, a first, multiplier type element 701, for example a bellows system 711, receives at its intake ambient air Pamb and air at pressure P28 that has been pressurised inside the high-pressure compressor to supply air at a pressure α*P28 at the outlet thereof; pressure multiplication is thus effected by the presence of a variable section 718 which depends directly on Pamb, and thus consequently on the altitude. The air at pressure α*P28 is then communicated to second, on/off type check valve 702, (all or nothing), which receives air at ambient pressure at the intake thereof.

The on-off check valve controls the transmission of P28 air to the ejector. To do this, the P28 air is sent into a compartment of which one outlet 713 is blocked by an extremity 714 of check valve 702; check valve 702 also comprises a base 715 braced against spring 716, the base being exposed on either side to air at ambient pressure Pamb which is sent to a second compartment 717 and to air that is pressurised to pressure α*P28. Thus, the check valve is controlled by the difference in pressure between Pamb and α*P28.

Figure 8A:
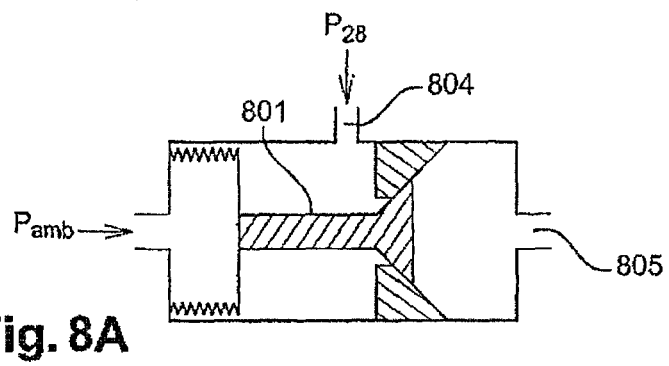
FIGS. 8A and 8B, show various representations of a second example of the apparatus according to an embodiment of the invention.
Figure 8B:
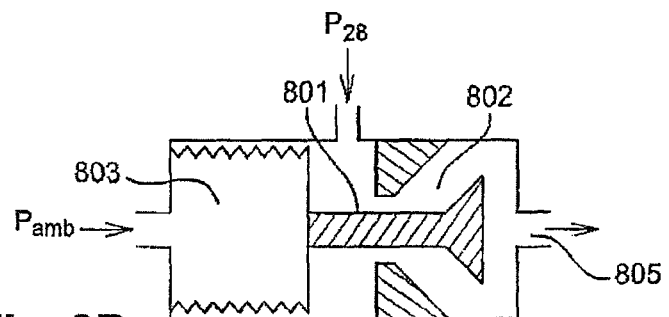

FIGS. 8A and 8B show respectively a first and second block diagram of the second exemplary apparatus according to an embodiment the invention. In this example, an opening section 802 of the valve is rendered dependent on ambient pressure Pamb. Consequently, one has created a passive valve with a variable section, the valve opening section changing progressively with the altitude by means of the movement of piston 801 to allow the air at pressure P28 to pass: the as the altitude increases, so the ambient pressure falls, and the passage section in the valve also falls correspondingly until it is closed completely, as shown in FIG. 8-A. The air at pressure P28 is injected into the apparatus through an aperture 804, and can only escape via an outlet 805 as long as opening cross section 802 is not zero. The movement of piston 801 may be initiated for example by a bellows 803 attached permanently to piston 801, subjected to ambient pressure, or it may be triggered by the use of aneroid cells.

The third example, shown in FIG. 6C, is also the object of a functional configuration that connects outlet 713 shown in FIG. 7-B to intake 804 shown in FIGS. 8A and 8B.

The descriptions above are intended to be illustrative, not limiting. Thus, it will be appreciated by one skilled in the art that modifications may be made to the invention as described without departing from the scope of the claims set out below.

What is claimed is:

1. An activation apparatus for a valve of an ejector of a chamber in an aircraft turbojet engine, which chamber is capable of variable pressurization, the apparatus comprising a first device constructed and arranged to trigger the opening and/or closing of the valve as a function of a triggering threshold that varies according to the altitude at which the valve is located, so that the valve is either at a fully open position or at a fully closed position as a function of a triggering threshold determined by the altitude, the first device including a first inlet to receive ambient air and a second inlet to receive air drawn from a high-pressure compressor so that, in use, the air drawn from the high-pressure compressor is sent through the valve to the ejector to create a Venturi effect in an open position of the valve, and is blocked by the valve in a closed position of the valve, wherein the first device comprises:

a multiplier element that is configured to receive the ambient air and the air drawn from the high-pressure compressor at its intake, said multiplier element adapted to modify a pressure of the air drawn from the high-pressure compressor; and an on-off check valve that is configured to receive the air supplied by the multiplier element at the modified pressure and the ambient air at its intake.

2. The apparatus of claim 1, wherein the air drawn from the high-pressure compressor is received by the multiplier element and sent through the valve.

3. The apparatus of claim 1, comprising a second device constructed and arranged to progressively open the valve as a function of the altitude at which the valve is located, wherein the valve is movable from a fully open position to a fully closed position, the valve assuming intermediate, partially open positions as a function of altitude.

4. The apparatus of claim 1, comprising a second device constructed and arranged to progressively open the valve as a function of the altitude at which the valve is located, wherein the valve is movable from a fully open position to a fully closed position, said valve assuming intermediate, partially open positions as a function of altitude until a triggering threshold that depends on the altitude relative to a pressure differential exerted on the valve is reached.

5. An aircraft comprising the activation apparatus of claim 1.

6. An activation apparatus for a valve of an ejector of a chamber in an aircraft turbojet engine, which chamber is capable of variable pressurization, the apparatus comprising a second device constructed and arranged to progressively open the valve as a function of the altitude at which the valve is located so that the valve is movable from a fully open position to a fully closed position, the valve assuming intermediate, partially open positions as a function of altitude, wherein the second device comprises a piston whose movement is controlled by a pressure of the ambient air, the movement of said piston is forming a passage, between the piston and a housing of the second device, having a profile that varies according to the pressure of the ambient air, which passage allows the air drawn from a high-pressure compressor to pass through the valve.

7. The apparatus of claim 6, wherein the air that controls the travel of the piston is the air from the high-pressure compressor of the turbojet engine.

8. An activation apparatus for a valve of an ejector of a chamber in an aircraft turbojet engine, which chamber is capable of variable pressurization, the apparatus constructed and arranged to trigger the opening and/or closing of the valve as a function of a triggering threshold that varies according to the altitude at which the valve is located, the apparatus comprising:
    a pressure multiplier element that includes a first chamber with an inlet to receive air drawn from a high-pressure compressor, an outlet and a bellows system, said bellows system movable by pressure of ambient air exerted on the bellows system so that a movement of the bellows system in the first chamber modifies a pressure of the air drawn from the high-pressure compressor received by the inlet; and
    an on-off check valve constructed and arranged to control a supply of the air drawn from the high-pressure compressor to the ejector, the on-off check valve including a second chamber with an inlet to receive the air drawn from the high-pressure compressor, an outlet in communication with the ejector and a piston that is movable between a first position in which the outlet is blocked by the piston and a second position in which the outlet is in communication with the inlet of the second chamber to permit the air drawn from the high-pressure compressor and receive by the inlet of the second chamber to flow toward the ejector, a movement of the piston between the first and second positions determined by a difference in pressure between the ambient air and the modified pressure of the air drawn from the high-pressure compressor outputted by the pressure multiplier element.

9. The apparatus of claim 8, wherein the on-off check valve comprises a third chamber with an inlet to receive the ambient air.

10. The apparatus of claim 8, wherein the piston includes a base that has a first side exposed to ambient air and a second side exposed to the air drawn from the high-pressure compressor at the modified pressure.

11. The apparatus of claim 8, wherein the piston is biased against a spring.

12. An activation apparatus for a valve of an ejector of a chamber in an aircraft turbojet engine, which chamber is capable of variable pressurization, the apparatus constructed and arranged to progressively open the valve as a function of the altitude at which the valve is located, the apparatus comprising:
    a first chamber with an inlet to receive air drawn from a high-pressure compressor;
    a second chamber with an outlet in communication with the ejector, and
    a piston that is movable at a plurality of positions,
    wherein, in use, a passage is formed between the first and second chamber, said passage having a gradually variable section that is determined by a movement of the piston between a first position in which the passage is blocked and a second position in which the passage is open to permit the air drawn from the high-pressure compressor to flow from the inlet of the first chamber to the outlet of the second chamber.

13. The apparatus of claim 12, wherein the piston is movable due to a pressure exerted by ambient air on the piston.

14. The apparatus of claim 12, wherein the piston is movable with aneroid cells.

* * * * *